United States Patent [19]
McNeley et al.

[11] Patent Number: 5,936,942
[45] Date of Patent: Aug. 10, 1999

[54] COMMUNICATION OF ALARM INFORMATION WITHIN A TELECOMMUNICATION SWITCHING SYSTEM

[75] Inventors: Kevin John McNeley, Succasunna, N.J.; Douglas Walter Sturm; Michelle Kust Yeager, both of Wheaton, Ill.

[73] Assignee: Lucent Technologies Inc., Murray Hill, N.J.

[21] Appl. No.: 08/703,137

[22] Filed: Aug. 29, 1996

[51] Int. Cl.⁶ ................................................. H04Q 11/04
[52] U.S. Cl. ........................... 370/244; 370/377; 370/522
[58] Field of Search .................................. 370/369, 370, 370/371, 372, 373, 383, 392, 375, 377, 384, 385, 522, 242, 244, 218, 220, 523, 528, 376

[56] References Cited

U.S. PATENT DOCUMENTS

| | | | |
|---|---|---|---|
| 4,280,217 | 7/1981 | Hafer et al. | 370/376 |
| 4,322,843 | 3/1982 | Beuscher et al. | 370/63 |
| 4,484,323 | 11/1984 | Beuscher et al. | 370/376 |
| 4,583,218 | 4/1986 | Ardon et al. | 370/376 |
| 4,621,357 | 11/1986 | Naiman et al. | 370/373 |
| 5,146,455 | 9/1992 | Goke et al. | 370/376 |
| 5,383,180 | 1/1995 | Kartalopoulos | 370/376 |

*Primary Examiner*—Chau Nguyen
*Attorney, Agent, or Firm*—Werner Ulrich

[57] ABSTRACT

It is important to report alarm signals rapidly and reliably to the master control units responsible for automatically responding to these alarm signals. Advantageously this is accomplished by transmitting the alarm signals through a switching network of a telecommunications switch, using auxiliary signaling bits provided with each time slot that is switched through the network. The alarm signals are encoded in groups of eight, using one bit of each of eight related time slots to provide an alarm signal within one frame of a digital transmission signal.

7 Claims, 2 Drawing Sheets

FIG. 2

| LEVEL TYPE | PRIORITY | FAILURE TYPE | ALARM COLOR | F0+ | F1+F2 | F3 | F4+F5 | F6+F7 |
|---|---|---|---|---|---|---|---|---|
| 4 STE | 12 | STE SECTION LOS | CGA-RED | 1 | 1 1 | 1 | 1 0 | 1 0 |
| 4 STE | 11 | STE SECTION LOF | CGA-RED | 1 | 1 1 | 0 | 1 0 | 1 0 |
| 4 STE | 10 | STE LINE AIS | CGA-BLUE | 1 | 1 1 | 0 | 1 1 | 1 0 |
| 3 STS | 9 | STS PATH AIS | CGA-BLUE | 1 | 1 0 | 0 | 1 1 | 1 0 |
| 3 STS | 8 | STS PATH LOP | CGA-RED | 1 | 1 0 | 0 | 1 0 | 1 0 |
| 3 STS | 7 | STS PATH YELLOW | CGA-YELLOW | 1 | 1 0 | 0 | 0 1 | 1 0 |
| 2 VT | 6 | VT PATH AIS | CGA-BLUE | 1 | 0 1 | 0 | 1 1 | 1 0 |
| 2 VT | 5 | VT PATH LOP | CGA-RED | 1 | 0 1 | 0 | 1 0 | 1 0 |
| 2 VT | 4 | VT PATH YELLOW | CGA-YELLOW | 1 | 0 1 | 0 | 0 1 | 1 0 |
| 1 DS1 | 3 | DS1 PATH AIS | CGA-BLUE | 1 | 0 0 | 0 | 1 1 | 1 0 |
| 1 DS1 | 2 | DS1 PATH LOF | CGA-RED | 1 | 0 0 | 0 | 1 0 | 1 0 |
| 1 DS1 | 1 | DS1 PATH YELLOW | CGA-YELLOW | 1 | 0 0 | 0 | 0 1 | 1 0 |
| - | - | ALL CLEAR | NO CGA | 1 | 0 0 | 0 | 0 0 | 0 1 |

5,936,942

COMMUNICATION OF ALARM INFORMATION WITHIN A TELECOMMUNICATION SWITCHING SYSTEM

TECHNICAL FIELD

This invention relates to the communication of alarm and other control signals between control units of a telecommunication switching system.

PROBLEM

Modern telecommunication switching systems are increasingly of a digital nature, switching digital signals from incoming digital facilities to outgoing digital facilities. As a result these switching systems have been able to take advantage of the enormous gain and speed of electronic and optical components to switch signals between an ever increasing number of incoming and outgoing voice and data channels. The use of optical transmission facilities has meant that the bundle of voice channels that is treated as a single entity has also increased in size. The result of this is that many trouble conditions are likely to affect hundreds or even thousands of telephone connections.

At the same time the demands for reliable telephone service are becoming ever more rigorous. The solution to this problem is two-fold: to provide adequate standby equipment which can be switched into service to replace a unit that is experiencing trouble, and to have transmission equipment which can reliably detect trouble conditions and rapidly forward that information to a controlling unit so that subsequent calls are re-routed over other transmission facilities. A problem of the prior art is that the signals which indicate trouble conditions are not transmitted as reliably and rapidly as possible to the control units which respond to such trouble conditions.

In prior art systems, such alarm signals are transmitted through intermediate control units over special control/messaging paths for transmitting control signals. The use of such control/messaging paths means that standard data messaging protocols cannot be used for transmitting the alarm signals through one or more intermediate control units to a destination through a switching network. For example, the 5ESS® switch manufactured by Lucent Technologies Inc. uses a message handler along with a common control unit to control the transmission of messages between individual transmission multiplex units of a 5ESS system and a control unit. Such an arrangement introduces additional processing to pass such messages.

In summary, a problem of the prior art is that there is no economic arrangement for reliably and rapidly transmitting high priority control signals, such as those which indicate alarms, to the appropriate control units.

SOLUTION

The above problem is solved and an advance is made over the teachings of the prior art in accordance with this invention, wherein, in a system which provides per channel signalling bits transmitted with each time slot through a switching network, an interface is provided to a transmission multiplex unit (TMUX) to use such signalling bits of a group of time slots to transmit alarm and other high priority control signals through the switching network of the telecommunication switch, and another interface unit is provided for receiving the extra signalling bits and convert them into alarm and other high priority signalling information sent to the control unit for responding to these alarm and high priority control signals. Advantageously, this arrangement allows such alarm and high priority control signals to be transmitted without using any extra channels of the switching network and without requiring these signals to be converted to separate messages and sent to the control unit via separate processors using private messaging busses and interfaces.

BRIEF DESCRIPTION OF THE DRAWING

FIG. 2 is a table showing the encoding of the twelve levels of alarm signals.

DETAILED DESCRIPTION

Figure 1:
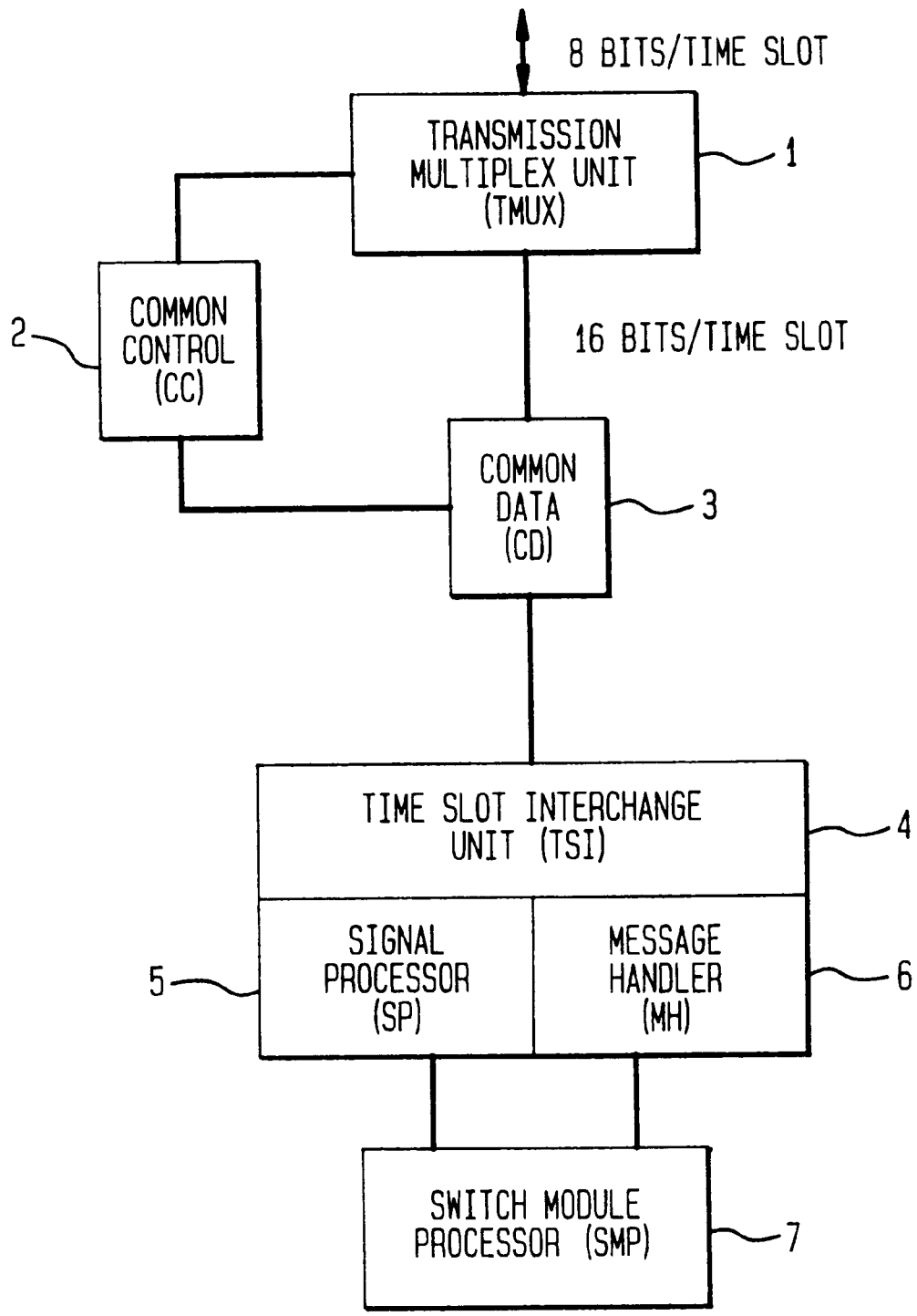
FIG. 1 is a block diagram illustrating applicants' invention.

FIG. 1 is a block diagram illustrating how control information is passed from a control unit, a transmission multiplex unit (TMUX) 1, to a second control unit, common control 2, (a control unit means for generating high priority control messages for insertion into supplementary signaling bits), then through an internal conversion unit, the common data unit 3, then via a time slot interchange unit 4 for switching time slots and supplementary signaling bits and message handler 6 to a master control unit, the switch module processor 7. (The common data unit 3 takes the 16 bits/time slot generated by the TMUX, assembles them in the correct order for each time slot and passes 16 bit time slot signals to the time slot interchange unit 4.) This control message channel is used for all communication between the transmission multiplex unit 1 and switch module processor 7 except for the communication of alarms. Importantly, in accordance with the principles of applicants' invention, a separate direct path through the switching network, using existing equipment, is provided for transmitting alarms from transmission multiplex unit 1 to the switching module processor 7.

Communication information, which is not the subject of this disclosure, is sent from TWUX 1 to CD 3 to TSI 4. TSI 4 has loop back paths and is connected to a time multiplexed switch (not shown) to switch communication and signaling signals (including all 16 bits per time slot) to other TSI units for communication to other TMUX units.

Transmission multiplex unit (TMUX) 1 receives inputs in the form of a bit stream comprising 8-bit time slots and other overhead bits. The TMUX extracts from this bit stream the signals that represent conditions such as a supervisory state for each DS0 time slot and alarms, and combines the 8-bit time slots with other information to generate the 16-bit time slots passed through the TSI. The derivation and the use of such 16-bit time slots is described, for example, in U.S. Pat. No. 4,322,843. In applicants' preferred embodiment, 7 such signaling bits are added and an eighth bit, a parity bit, is also added to the 8-bit time slots of a communication channel. As a result, 16 bits are transmitted through the time slot interchange (TSI) unit 4 which forms the basic element of the switching network of applicants' preferred embodiment.

The seven signaling bits are commonly referred to by the letters A, B, C, D, E, F, & G. One of the signalling bits, the E-bit, is conventionally used to transmit a supervisory state of the customer sources of the communication signal. In accordance with the specific embodiment of applicants' invention, the F-bit of the first eight DS0 channels of the group of 24 DS0 channels derived from each DS1 signal is used for encoding and transmitting a 12-level hierarchy of alarms from the TMUX 1 unit to the switching module processor (SMP) 7.

If the TMUX detects an alarm condition, it transmits this alarm indication in a signal associated with the 24 channel (DS1) group for which the alarm was detected. If the TMUX detects an STS or STE level signal, i.e., an alarm signal for a group of 28 DS1 signals, it transmits this indication over a preselected master DS1 group of DS0 channels, the master DS1 being one of the DS1s of the group of 28 for that STS or STE signal. All types of alarm conditions are encoded and transmitted as an 8-bit continuous signal on the F-bits of the first eight 16-bit time slots associated with the DS1 or VT experiencing the alarm condition or the selected master DS1. If the alarm is an STS/STE level alarm, it is transmitted on the first eight 16-bit time slots with the master DS1 signal. The alarm information is sent on the F-bits of the first 8 channels of a 24 channel group.

The alarm signals are detected by signal processor (SP) 5 which looks at the F-bit of the first DS0 channel of each group of 24 DS0 channels; if the SP detects a change (toggle) in this bit, it passes directly to the switch module processor an 8-bit byte representing the F-bits of the first 8 channels of the group of 24. The F-bits from the other 7 channels are encoded to identify the type of alarm.

FIG. 2 is a table illustrating the coding of alarms in applicants' preferred embodiment. In this embodiment, there are 4 levels of alarm signals, and three types of signals within each level. The arrangement is fully hierarchical in that within each level, the higher alarm predominates over a lower alarm and, effectively, suppresses the lower alarm indication. Similarly, any alarm of a higher level predominates over any alarm at a lower level.

The lowest level corresponds to a 24 channel DS1 signal. The next higher level (Virtual Tributary (VT)) includes all the overhead bits used to carry the DS1 signal. The next higher level (Synchronous Transport Signal (STS)) includes the signal for carrying 28 DS1 signals, a total of 672 channels. Finally, the highest level (Sonet Terminating Equipment (STE)) includes all of the overhead bits used to carry the 672 channels.

Some alarms, such as loss of frame or loss of signal are detected locally. Others are detected remotely and transmitted in the overhead bits. The STS, VT and DS1 levels each include three types of alarms, listed highest to lowest: path alarm indication signal (AIS) (blue alarm); path loss of frames (LOF) or loss of pointer (LOP) (red alarm); and path yellow alarm (indicating a remote end failure to receive an outgoing signal). The highest level of alarms, STE, has three sub-levels, listed highest to lowest: section loss of signal (LOS) (red alarm); section loss of frame (LOF) (red alarm); and line alarm indication signal (AIS) (blue alarm). The order of colors of alarms is different in the highest level because the types of alarms are different; there remains a consistency of meaning of each color.

The signal processor only reports changes in the alarm signals. Therefore, these signals are advantageously coded so that one bit, i.e., the F-bit of the lowest (zeroeth) (F-0) channel of the group of 8 channels is used to report a change of alarm signal. The signal processor looks for a change and when that change is found, examines and reports the other 7 F-bits. The latter are encoded in groups: a first pair (F1, F2) encodes the level of the alarm signal; a second pair (F4, F5) encodes the type of alarm signal (red, blue, yellow) within a level. F3 is encoded as 1 only for the highest priority alarm (STE, section loss of signal). F-6 is 1 for all active alarm indications. F7 is zero except for the case wherein all alarm indications are clear. In addition, the special combinations F6, F7=00 (representing unequipped facilities) and 11 (representing out-of-service, manually removed) are used to represent special maintenance states for which any alarm report is invalid.

Many similar arrangements can be derived by those of ordinary skill in the art, without departing from the principles of applicants' invention. The invention is therefore only limited by the attached claims.

We claim:

1. In a telecommunications switching system having means for switching supplementary signaling bits associated with time slots through a switching network for switching time slots, apparatus for transmitting high priority control messages through said switching network to a master control unit, comprising:

a control unit means for generating a high priority control message;

means for inserting said high priority control message into one or more supplementary bits of a plurality of time slots;

means in said switching network for transmitting said supplementary bits of each of said time slots; and means for extracting said one or more supplementary bits of said plurality of time slots and assembling said high priority control message from a plurality of time slots from outputs of said switching network; and means for transmitting said extracted high priority control message to said master control unit.

2. The system of claim 1 wherein said means for extracting comprises a signal processor and wherein said signal processor examines one bit of said supplementary bits of said plurality of time slots and determines that a high priority control message is present if said one bit has changed from its previous state.

3. The system of claim 1 wherein said high priority control message is an alarm message.

4. In a telecommunications switching system having means for switching supplementary signaling bits associated with time slots through a switching network for switching time slots, apparatus for transmitting high priority control messages through said switching network to a master control unit, comprising:

a control unit means for generating a high priority control message;

means for inserting said high priority control message into one or more supplementary bits of a plurality of time slots;

means in said switching network for transmitting said supplementary bits of each of said time slots; and means for extracting said high priority control message from outputs of said switching network; and means for transmitting said extracted high priority control message to said master control unit;

wherein a predetermined set of bits of said high priority control message define the level of an alarm signal.

5. The system of claim 4 wherein another predetermined set of bits of said high priority control message defines the type of an alarm signal within a level.

6. In a telecommunications switching system having means for switching supplementary signaling bits associated with time slots through a switching network for switching time slots, apparatus for transmitting high priority control messages through said switching network to a master control unit, comprising:

a control unit means for generating a high priority control message;

means for inserting said high priority control message into one or more supplementary bits of a plurality of time slots;

means in said switching network for transmitting said supplementary bits of each of said time slots; and means for extracting said high priority control message from outputs of said switching network; and means for transmitting said extracted high priority control message to said master control unit;

wherein a predetermined set of bits of said high priority control message define the level of an alarm signal.

7. The system of claim 3 wherein a predetermined bit of said alarm message is used to indicate the presence of a very high priority alarm message.

\* \* \* \* \*